(12) United States Patent
Nishimura et al.

(10) Patent No.: US 12,087,975 B2
(45) Date of Patent: Sep. 10, 2024

(54) LITHIUM PRIMARY BATTERY

(71) Applicant: Panasonic Intellectual Property Management Co., Ltd., Osaka (JP)

(72) Inventors: Naoaki Nishimura, Osaka (JP); Tadayoshi Takahashi, Osaka (JP); Kyosuke Okazaki, Osaka (JP); Futoshi Tanigawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 529 days.

(21) Appl. No.: 17/286,891

(22) PCT Filed: Aug. 7, 2019

(86) PCT No.: PCT/JP2019/031159
§ 371 (c)(1),
(2) Date: Apr. 20, 2021

(87) PCT Pub. No.: WO2020/095500
PCT Pub. Date: May 14, 2020

(65) Prior Publication Data
US 2021/0384526 A1 Dec. 9, 2021

(30) Foreign Application Priority Data
Nov. 7, 2018 (JP) .................. 2018-209987

(51) Int. Cl.
*H01M 6/14* (2006.01)
*H01M 4/02* (2006.01)
(Continued)

(52) U.S. Cl.
CPC .............. *H01M 6/14* (2013.01); *H01M 4/06* (2013.01); *H01M 4/405* (2013.01); *H01M 4/502* (2013.01);
(Continued)

(58) Field of Classification Search
CPC ........ H01M 4/06; H01M 4/405; H01M 4/502; H01M 6/14; H01M 2004/021;
(Continued)

(56) References Cited

U.S. PATENT DOCUMENTS

| 4,937,154 A | 6/1990 | Moses et al. |
| 5,527,644 A | 6/1996 | Kita et al. |

(Continued)

FOREIGN PATENT DOCUMENTS

| EP | 3188284 A1 | 7/2017 |
| JP | 55-146873 | 11/1980 |

(Continued)

OTHER PUBLICATIONS

English translation of JP Publication 2009-252731, Oct. 2009.*
(Continued)

*Primary Examiner* — Brittany L Raymond
(74) *Attorney, Agent, or Firm* — Rimon P.C.

(57) ABSTRACT

A lithium primary battery includes a wound electrode body obtained by winding a sheet-like positive electrode, a sheet-like negative electrode, and a separator interposed between the positive electrode and the negative electrode, and a nonaqueous electrolyte solution. The positive electrode includes manganese dioxide as a positive electrode active material. The negative electrode includes at least one selected from the group consisting of metallic lithium and lithium alloys, and has a first principal surface and a second principal surface opposite to the first principal surface. An entire surface of each of the first principal surface and the second principal surface faces the positive electrode. A total area of the first principal surface and the second principal surface is 100 cm$^2$ or more and 180 cm$^2$ or less.

18 Claims, 1 Drawing Sheet

(51) Int. Cl.
  *H01M 4/06* (2006.01)
  *H01M 4/40* (2006.01)
  *H01M 4/50* (2010.01)
  *H01M 50/107* (2021.01)
  *H01M 50/409* (2021.01)
  *H01M 50/449* (2021.01)
  *H01M 50/489* (2021.01)
  *H01M 50/491* (2021.01)

(52) U.S. Cl.
  CPC ....... *H01M 50/107* (2021.01); *H01M 50/409* (2021.01); *H01M 50/449* (2021.01); *H01M 50/489* (2021.01); *H01M 50/491* (2021.01); *H01M 2004/021* (2013.01)

(58) Field of Classification Search
  CPC ............. H01M 50/107; H01M 50/449; H01M 50/491; H01M 6/10
  See application file for complete search history.

(56) References Cited

U.S. PATENT DOCUMENTS

| | | | |
|---|---|---|---|
| 2003/0113628 A1 | 6/2003 | Paulot et al. | |
| 2008/0107965 A1* | 5/2008 | Suzuki | H01M 4/485 429/199 |
| 2009/0113697 A1 | 5/2009 | Yamamoto et al. | |
| 2010/0310910 A1 | 12/2010 | Huang et al. | |
| 2016/0344060 A1* | 11/2016 | Asano | H01M 50/461 |
| 2020/0066462 A1 | 2/2020 | Kapelushnik | |

FOREIGN PATENT DOCUMENTS

| | | | |
|---|---|---|---|
| JP | 59-205160 | | 11/1984 |
| JP | 2-257573 | | 10/1990 |
| JP | 7-282818 | | 10/1995 |
| JP | 2003-178755 | | 6/2003 |
| JP | 2008-112638 | | 5/2008 |
| JP | 2009-252731 | * | 10/2009 |
| JP | 2012-138225 | * | 7/2012 |
| JP | 2015-162425 A | | 9/2015 |
| JP | 2018-056075 | | 4/2018 |
| JP | 2018-163765 | | 10/2018 |
| WO | 2015/136837 | | 9/2015 |
| WO | 2017/199234 A1 | | 11/2017 |

OTHER PUBLICATIONS

The Extended European Search Report dated Dec. 3, 2021 for the related European Patent Application No. 19881239.8.
International Search Report of PCT application No. PCT/JP2019/031159 dated Sep. 17, 2019.
English Translation of Chinese Office Action dated Jul. 10, 2024 for the related Chinese Patent Application No. 201980073453.8.

* cited by examiner

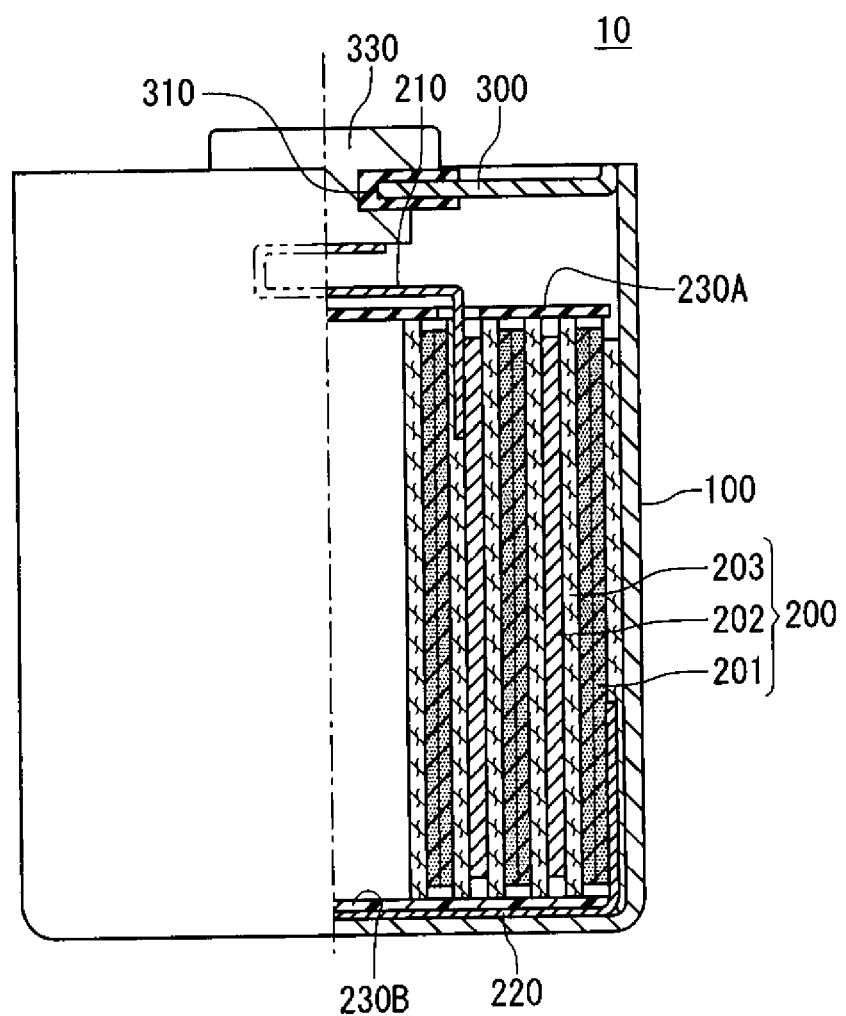

LITHIUM PRIMARY BATTERY

CROSS-REFERENCE TO RELATED APPLICATIONS

This application is a U.S. national stage application of the PCT International Application No. PCT/JP2019/031159 filed on Aug. 7, 2019, which claims the benefit of foreign priority of Japanese patent application No. 2018-209987 filed on Nov. 7, 2018, the contents all of which are incorporated herein by reference.

TECHNICAL FIELD

The present invention relates to a lithium primary battery including a wound electrode body.

BACKGROUND ART

Recently, with the development of IoT technology, communication functions have been installed in various things or devices. Data collection, remote control of things or devices are becoming carried out. In fields such as electric power, gas, and water supply, introduction of a meter having a communication function, instead of conventional meter, is being considered.

Conventionally, for power sources of meters, a lithium thionyl chloride primary battery (also referred to as an ER battery), a lithium manganese dioxide primary battery (also referred to as a CR battery), and the like, have been used. In meters having a communication function, the required current when communication is not performed (hereinafter referred to as a base current) is low, but a certain level of current (more specifically, a pulse current) is required when communication is performed, and therefore, it is advantageous to use a CR battery employing a wound electrode body (Patent Literatures 1 to 3). Furthermore, a life expected of a conventional meter as a product (hereinafter referred to as an expected life) is 10 years, but a meter having a communication function requires a longer expected life of 20 years.

CITATION LIST

Patent Literature

PTL 1: Japanese Patent Application Unexamined Publication No. 2008-112638
PTL 2: Japanese Patent Application Unexamined Publication No. H7-282818
PTL 3: Japanese Patent Application Unexamined Publication No. H2-257573

SUMMARY OF THE INVENTION

An ER battery has a relatively long life, but includes a liquid active material. Therefore, it is difficult to increase an area of an electrode as compared with a wound type. Accordingly, the ER battery is not suitable for pulse discharge of a large electric current. The CR battery can easily increase an area of an electrode when it is formed in a wound type, so that discharge performance of a pulse current is high. However, due to the discharge of a base current, metallic manganese precipitates and accumulates on the surface of the negative electrode, so that the internal resistance tends to increase greatly. Therefore, it is difficult to secure an expected life of 20 years.

A first aspect of the present disclosure relates to a lithium primary battery including a wound electrode body obtained by winding a sheet-like positive electrode, a sheet-like negative electrode, and a separator interposed between the positive electrode and the negative electrode; and a nonaqueous electrolyte solution, wherein the positive electrode includes manganese dioxide as a positive electrode active material, the negative electrode includes at least one selected from the group consisting of metallic lithium and lithium alloys, and has a first principal surface and a second principal surface opposite to the first principal surface, an entire surface of each of the first principal surface and the second principal surface faces the positive electrode, and a total area of the first principal surface and the second principal surface is 100 $cm^2$ or more and 180 $cm^2$ or less.

In the lithium primary battery, discharge performance of a base current as a minute current and a pulse current as a large current, and a long life can be both achieved.

BRIEF DESCRIPTION OF DRAWINGS

FIG. 1 is a front view in a schematic section in a vertical direction, showing a part of a lithium primary battery in accordance with an embodiment of the present invention.

DESCRIPTION OF EMBODIMENTS

[Lithium Primary Battery]

A lithium primary battery in accordance with the above aspect of the present invention includes a wound electrode body obtained by winding a sheet-like positive electrode, a sheet-like negative electrode, and a separator interposed between the positive electrode and the negative electrode; and a nonaqueous electrolyte solution. The positive electrode includes manganese dioxide as a positive electrode active material. The negative electrode includes at least one selected from the group consisting of metallic lithium and lithium alloys, and has a first principal surface and a second principal surface opposite to the first principal surface. An entire surface of each of the first principal surface and the second principal surface faces the positive electrode. A total area of the first principal surface and the second principal surface is 100 $cm^2$ or more and 180 $cm^2$ or less.

In a lithium primary battery including a negative electrode including metallic lithium and/or a lithium alloy, and a positive electrode including manganese dioxide as a positive electrode active material, when a wound electrode body is employed, a large current is easily taken out. When the negative electrode of the lithium primary battery is brought into contact with a nonaqueous electrolyte solution, organic and inorganic coating films are formed on the surface of the negative electrode. If a battery is used for a long period of time such as 20 years, metal manganese precipitates and accumulates on the surface of the negative electrode, and accordingly increase of the internal resistance will become non-negligible. For example, when it is necessary to discharge a pulse current for communication and the like, a sufficient voltage cannot be secured due to the increase of the internal resistance, a pulse current may be unable to be discharged. In general, a lithium primary battery is designed to have design capacity necessary to a device life. In such a battery, when pulse discharge cannot be carried out due to the increase of the internal resistance, the device does not work, a utilization rate of the battery capacity scheduled to be used is reduced, and the battery must be replaced. In this way, in the CR battery, it is generally difficult to achieve both discharge performance of a pulse current and a long life.

Note here that in the above-mentioned lithium primary battery, besides the metal manganese, manganese oxide may precipitate. However, the manganese oxide is usually reduced and converted into metal manganese. Therefore, in the following, the metal manganese includes metal manganese generated via metallic oxide. Furthermore, the increase of the internal resistance is described to be mainly caused by accumulation of metal manganese, but an increase of the internal resistance by manganese oxide is not intended to be excluded.

It is estimated that an organic coating film or an inorganic coating film are broken by an electrolyte solution on a negative electrode lithium surface because of discharge of a base current, an active lithium surface appears, a precipitation reaction of metal manganese and a reaction with an electrolyte solution occur simultaneously, and precipitation and accumulation of manganese progress gradually. On the other hand, according to the above aspect of the present invention, in the lithium primary battery including the wound electrode body, entire surfaces of both principal surfaces (that is, a first principal surface and a second principal surface) of a sheet-like negative electrode constituting an electrode body are allowed to face the positive electrode, and a total area of the both principal surfaces is made to be 100 $cm^2$ or more and 180 $cm^2$ or less. Thus, even when metal manganese precipitates on the surface of the negative electrode due to discharge with a base current, metal manganese can be removed when a pulse current is discharged. Accordingly, accumulation of the metal manganese on the negative electrode is suppressed or reduced. Thus, since the increase of the internal resistance is suppressed, a long life can be secured. Therefore, discharge performance of a pulse current and a long life can be achieved. When the increase of the internal resistance is suppressed, the utilization rate of the battery capacity with respect to the design capacity can be enhanced. Therefore, even when a battery is used for IoT devices such as a meter having a communication function, a long expected life such as 20 years can be secured.

On the other hand, when the total area of the first principal surface and the second principal surface exceeds 180 $cm^2$, a large discharge current is easily secured, and accordingly, a pulse discharge can be carried out even if an entire electrode is not used. Since unevenness occurs in the discharge reaction in the electrode, a portion where the metallic manganese precipitates cannot be removed occurs in the negative electrode. If this state continues for a long period of time, the entire surface of the negative electrode is covered with metal manganese, and the internal resistance is greatly increased to shorten the life. When the total of the first principal surface and the second principal surface is less than 100 $cm^2$, when a battery is used for a long period of time, not a precipitation reaction of metal manganese but a side reaction of the coating film generation involved in the nonaqueous electrolyte solution continuously occurs so as to increase resistance. Furthermore, since the electrode reaction cannot keep up due to small facing area, it becomes difficult to secure the discharge performance of the pulse current. As a result, the life is shortened. Furthermore, when the first principal surface and/or the second principal surface include a region that does not face the positive electrode, this region that does not face the electrode also contributes to discharge reaction, thereby unevenness in a reaction occurs also in the facing surface. Since this unevenness in a reaction causes nonuniform precipitation of metal manganese, the utilization rate of the battery capacity with respect to the design capacity is reduced after a long period of time of use.

Note here that the sheet-like negative electrode has two principal surfaces occupying a major part of the surface of the negative electrode. The two principal surfaces include a principal surface defined as a first principal surface and a principal surface (another principal surface) defined as the second principal surface opposite to the first principal surface. The sheet-like negative electrode includes an end surface in addition to the first principal surface and the second principal surface. The end surface links the first principal surface and the second principal surface. An area of each principal surface refers to an area projected in the thickness direction of the sheet of each principal surface in a state in which the sheet is in a flat state. Note here that in each principal surface, when a place having neither metallic lithium nor lithium alloy is present, an area of this surface is excluded in calculation of the area of each principal surface. The total area of the first principal surface and the second principal surface naturally excludes an area of the end face.

In the above-mentioned lithium primary battery, it is preferable that capacity Cn of the negative electrode is larger than capacity Cp of the positive electrode. In this case, an effect obtained by allowing the entire surfaces of the first principal surface and the second principal surface to face the positive electrode is remarkably obtained. Furthermore, the utilization rate of the battery capacity with respect to the design capacity can further be enhanced. The ratio Cn/Cp, the ratio of the capacity Cn of the negative electrode to the capacity Cp of the positive electrode may be larger than 1, for example, 1.05 or more, and may be 1.10 or more. From the viewpoint of securing a high energy density, the Cn/Cp ratio is preferably 1.2 or less.

The above-mentioned lithium primary battery has design capacity of at least 2.9 Ah or more assuming that the maximum battery capacity is achieved with the present device specifications, and the capacity can be 3.0 Ah or more in terms of a margin. According to the above aspect of the present invention, the design capacity can further be enhanced. In this case, the size of the battery may be increased. The designed capacity can be reduced to 2.8 Ah or 2.7 Ah or more by the power saving of the device.

Note here that in the case that CnCp is satisfied, the design capacity of the lithium primary battery is determined by subtracting the pre-discharge amount $C_0$ from a value obtained by multiplying a mass (g) of manganese dioxide used in the positive electrode and the utilization rate $r_p$ of manganese dioxide by the theoretical capacity of manganese dioxide (308 mAh/g). Herein, the pre-discharge amount $C_0$ is an amount of electricity (Ah) when the battery is discharged until the voltage becomes 3.2 V after the battery is assembled. Note here that when the battery is assembled, since the activity of the manganese dioxide is high, a battery voltage is about 3.6 V, and a decomposition reaction of the nonaqueous electrolyte occurs. Therefore, in general, the discharge processing is carried out to decrease a battery voltage in advance, and to stabilize the battery property. Such discharge processing is generally referred to as pre-discharge. The utilization rate $r_p$ of manganese dioxide is an empirical utilization rate of $MnO_2$ in the raw material manganese dioxide to be used for the positive electrode, and the ratio of $MnO_2$ included in the raw material manganese dioxide may be used. For example, in a case where m (g) of electrolyzed manganese dioxide having a utilization rate $r_p$ of $MnO_2$ of 0.93 is used for the positive electrode, the design capacity is m (g)×0.93×0.308 (Ah/g)−$C_0$ (Ah). Furthermore, when Cn<Cp is satisfied, the design capacity can be obtained, for example, by multiplying the mass (lithium atom conversion) (g) of lithium included in the negative electrode, the theoretical capacity of metallic lithium (3861 mAh/g), and the utilization rate $r_n$ of lithium in the negative electrode. When a battery is designed, since it needs to be considered to subtract the presence of lithium that is not used for discharge, the utilization rate $r_n$ is lower as compared with the $r_p$ value of the above example, and is, for example, 0.9.

The above-mentioned lithium primary battery is suitable to be installed in a device controlled so that a pulse current and a base current smaller than the pulse current are discharged. When a lithium primary battery is installed in such a device, high discharge performance of a pulse current is secured more efficiently and a long life is achieved. A long expected life such as 20 years can be secured. However, applications of the lithium primary battery are not limited to such an application, and the lithium primary battery can be used for application that requires only a pulse current or a base current.

Hereinafter, the configuration of the lithium primary battery in accordance with the above aspect is described specifically.

(Negative Electrode)

A negative electrode includes metallic lithium and/or a lithium alloy. Examples of the lithium alloy include Li—Al, Li—Sn, Li—Ni—Si, Li—Pb, and the like. As the lithium alloy, a Li—Al alloy is preferable from the viewpoint of electric potential and alloyed composition with lithium. The content of metallic elements other than lithium included in the lithium alloy is preferably 0.05 mass % or more and 1.0 mass % or less with respect to the metallic element alloyed with lithium.

As the sheet-like negative electrode, for example, a metal foil including metallic lithium and/or a lithium alloy is used. The sheet-like negative electrode can be formed by, for example, extrusion molding metallic lithium and/or a lithium alloy.

A total area of the first principal surface and the second principal surface of the sheet-like negative electrode may be 100 cm$^2$ or more. When an appropriate facing area is secured and an electrode reaction is allowed to proceed efficiently, the pulse discharge performance is further improved. From the viewpoint of improvement of the discharge performance, the total area is preferably 130 cm$^2$ or more. The total area of the first principal surface and the second principal surface is only required to be 180 cm$^2$ or less, thus making the discharge reaction in the electrode more uniform. From the viewpoint of further improvement of the expected life, the area is preferably 160 cm$^2$ or less, and more preferably 150 cm$^2$ or less. These lower limit values and upper limit values can be arbitrarily combined.

In the above aspect of the present invention, in a wound electrode body, when the negative electrode is disposed such that an entire surface of each of the first principal surface and the second principal surface faces the positive electrode, a high energy density can be secured, a long life can be easily achieved, and a high utilization rate of the battery capacity with respect to the design capacity can be secured. Similar to the case of the negative electrode, the sheet-like positive electrode also has one principal surface (hereinafter, referred to as a third principal surface) and another principal surface (a principal surface opposite to the third principal surface (hereinafter, referred to as a fourth principal surface)). A difference (Sp−Sn) between a total area Sp of the third principal surface and the fourth principal surface and a total area Sn of the first principal surface and the second principal surface may be 0 cm$^2$ or more, and may be determined depending on a battery size. For example, in a battery having design capacity of 2.9 Ah or more and 3.5 Ah or less, the difference is, for example, 10 cm$^2$ or more and 60 cm$^2$ or less. By adjusting the difference, a high capacity can be easily secured, and the utilization rate can be enhanced more easily. Note here that an area of each principal surface of the positive electrode refers to an area projected in the thickness direction of the sheet of each principal surface in a state in which the sheet is in a flat state. The total surface Sp of the principal surfaces of the positive electrode does not include an area of a region in which a positive electrode active material (more specifically, the below-mentioned positive electrode mixture layer) is not present. Such a region is preferably provided in a portion in the positive electrode, which does not face the principal surfaces of the negative electrode. The positive electrode active material in a portion in which the positive electrode does not face the principal surfaces of the negative electrode is gradually used during discharge of a base current, so that a high utilization rate is secured.

(Positive Electrode)

A positive electrode includes manganese dioxide as an active material. The positive electrode includes, for example, a positive electrode current collector, and a positive electrode mixture layer.

As materials of the positive electrode current collector, a metal material including stainless steel, Al and/or Ti can be used. As the stainless steel, stainless steels having high corrosion resistance, such as SUS444 and SUS316, are preferable. As to the metal materials including Al and/or Ti may be an elemental substance or an alloy. As the positive electrode current collector, for example, a sheet or a porous body is used. As the positive electrode current collector, a metal foil and the like may be used. Furthermore, as the porous positive electrode current collector, a metal mesh (or net), expand metal, punching metal, and the like, may be used.

The positive electrode mixture constituting the positive electrode mixture layer may include a binding agent and/or a conductive agent, and the like, as an arbitrary component in addition to the positive electrode active material. Examples of the binding agent include fluororesin, polyacrylonitrile, polyimide resin, acrylic resin, polyolefin resins, rubbery polymer, and the like. Examples of the fluororesin include polytetrafluoroethylene, polyvinylidene fluoride, and the like. The positive electrode mixture may include one type or two or more types of binding agents.

As the conductive agent, a carbon material is preferable. Examples of the carbon material include carbon black (acetylene black, Ketjen black, etc.), a carbon nanotube, graphite, and the like. The positive electrode mixture may include one type or two or more types of conductive agents. The conductive agent may be interposed between the positive electrode current collector and the positive electrode mixture layer.

A method for manufacturing a positive electrode is not particularly limited. A positive electrode can be obtained, for example, by attaching a positive electrode mixture to a positive electrode current collector. For example, a positive electrode mixture may be applied to a positive electrode current collector, or may be filled in a porous positive electrode current collector. Furthermore, a positive electrode mixture may be molded into a sheet shape, or laminated so as to be in physical contact with a positive electrode current collector. When the positive electrode is produced, the positive electrode mixture may be used in a paste state or a clay state using a dispersion medium (for example, water and/or an organic medium) as necessary in addition to the component of the positive electrode mixture. In an appropriate stage of producing the positive electrode, drying may be carried out as necessary, and compression (roll and the like) toward the thickness direction of the positive electrode may be carried out.

(Separator)

For a separator, a porous sheet having ionic permeability and insulation property is used. Examples of the porous sheet include a microporous film, woven fabric, and non-woven fabric. The separator may have a single layer structure or a multilayer structure. Examples of the separator having a multilayer structure include separator including a plurality of layers having different materials and/or structures. For example, a separator including a plurality of layers having the same material and different fiber diameter and/or air permeability, or a separator including a plurality of layers having different materials may be used. Use of the separator having a multilayer structure increase the length of a path in the separator in which ion penetrates. The separator having a multilayer structure is advantageous in terms of prolonging a life because it suppresses precipitation of manganese metal manganese, as compared with a separator having a single layer structure. From the viewpoint of increasing an effect of suppressing the precipitation of metal manganese, it is preferable to use a separator having a multilayer structure of at least three layers or more. In the separator having a multilayer structure of at least three layers or more, at least two layers of materials and/or structures may be different. For example, in the separator having a three-layered structure, outer two layers have material and structure, and material and/or structure in the center one layer is allowed to be different from the outer layers.

The material of the separator is not particularly limited, and it may be a polymer material. Examples of the polymer material include olefin resin (polyethylene, polypropylene, a copolymer of ethylene and propylene, and the like), polyamide resin, polyimide resin (polyimide, polyamide-imide, and the like), cellulose, polyphenylene sulfite (PPS), polytetrafluoroethylene (PTFE), and the like. The separator may include additives as necessary, and examples of the additive include an inorganic filler, and the like.

A thickness of the separator can be selected from, for example, a range of 10 μm or more and 200 μm or less. The separator is formed of a microporous film, the thickness of the separator is, for example, 10 μm or more and 80 μm or less, and preferably 20 μm or more and 70 μm or less. In particular, it is more advantageous from the viewpoint of prolonging a life that a microporous film having a small thickness of more than 20 μm and less than 60 μm (preferably a thickness of 30 μm or more and 50 μm or less) is used as the separator because the internal resistance can be suppressed to be low and the accumulation of metallic manganese can be suppressed. Furthermore, when a separator including a non-woven fabric is used, the thickness of the separator can be selected from a range of 100 μm or more and 200 μm or less. It is further advantageous from the viewpoint of prolonging a life that a microporous film and a non-woven fabric are combined.

(Nonaqueous Electrolyte Solution)

As a nonaqueous electrolyte solution, a nonaqueous electrolyte solution having lithium ion conductivity is used. Such a nonaqueous electrolyte solution include a nonaqueous solvent and a lithium salt as an electrolyte dissolved in the nonaqueous solvent. The nonaqueous electrolyte solution is prepared by dissolving the lithium salt in the nonaqueous solvent.

As the lithium salt, lithium salts used for a nonaqueous electrolyte solution of the lithium primary battery can be used without particular limitation. Examples of the lithium salt include lithium borofluoride, lithium hexafluorophosphate, lithium trifluoromethanesulfonate, lithium bis(fluorosulfonyl)imide, lithium bis(trifluoromethylsulfonyl)imide, lithium perchlorate, and the like. The nonaqueous electrolyte solution may include one type of lithium salt or two or more types of lithium salts.

Nonaqueous solvents include, for example, but are not limited to, esters (for example, carbonate ester, carboxylic ester such as γ-butyrolactone, etc.) and ethers (1,2-dimethoxyethane, etc.). Examples of the carbonate ester include cyclic carbonate (propylene carbonate, ethylene carbonate, etc.), chain carbonate (diethyl carbonate, ethyl methyl carbonate, and the like), and the like. The nonaqueous electrolyte solution may include one type nonaqueous solvent or two or more types of nonaqueous solvents.

The concentration of the lithium salt in the nonaqueous electrolyte solution is, for example, 0.1 mol/L or more and 3.5 mol/L or less.

The nonaqueous electrolyte solution may include additives as necessary. Examples of the additives include vinylene carbonate, fluoroethylene carbonate, vinyl ethyl carbonate, and the like. One type of additive may be used, or two types of more additives may be used in combination.

(Others)

A wound electrode body is formed by spirally winding a negative electrode, a positive electrode, and a separator interposed between these electrodes. At this time, when the negative electrode and the positive electrode are disposed with a separator interposed between these electrodes, an entire surface of each of the first principal surface and the second principal surface of the negative electrode faces the positive electrode.

A lithium primary battery usually includes a battery can housing a wound electrode body and a nonaqueous electrolyte solution, and a sealing body that seals an opening of the battery can. The lithium primary battery is produced by housing the wound electrode body and the nonaqueous electrolyte solution in the battery can, and sealing the opening of the battery can with the sealing body. The battery can and the sealing body are respectively formed of iron, an iron alloy (stainless steel and the like), aluminum, an aluminum alloy (an aluminum alloy containing a small amount of other metals such as manganese and copper, and the like), and may be subjected to metal plating as necessary. The battery can and the sealing body may be respectively electrically connected to any one of the positive electrode and the negative electrode of the electrode body. The opening of the battery can may be sealed by caulking of the peripheral edge of the sealing body, or by laser welding of the sealing body and the peripheral edge of the opening of the battery can. When sealing is carried out by the former method, an insulating gasket is disposed between the opening of the battery can and the peripheral edge of the sealing body. When sealing is carried out by the latter method, the sealing body and the external terminal are formed as separate members, an insulating gasket is disposed between the external terminal and the sealing body. For applications that require an extremely long expected life, such as 20 years, it is preferable to carry out laser welding between the opening of the battery can and the sealing body. This case is advantageous in securing a longer life because it can reduce the influence of intrusion of air into the battery and the volatilization of the nonaqueous electrolyte. Note here that the influence of intrusion of air into the battery and the volatilization of the nonaqueous electrolyte is a multiplier of the number of years of use. Accordingly, it is considered that the longer the number of years of use is, the larger the influence is.

FIG. 1 is a front view in a schematic section in a vertical direction, showing a part of a lithium primary battery in accordance with an embodiment of the present invention.

Lithium primary battery 10 includes battery can 100 having a bottomed cylindrical shape, wound electrode body 200 housed in battery can 100, and sealing plate 300 that seals an opening of battery can 100. Sealing plate 300 is fixed in the vicinity of the opening of battery can 100 by welding. In the center of sealing plate 300, an opening portion is formed. External terminal 330 is disposed in this opening portion. Insulating gasket 310 is disposed between external terminal 330 and sealing plate 300.

Wound electrode body 200 is formed by spirally winding sheet-like positive electrode 201 and sheet-like negative electrode 202 with sheet-like separator 203 therebetween. To one of positive electrode 201 and negative electrode 202 (in the example of the drawing, negative electrode 202), internal lead wire 210 is connected. Internal lead wire 210 is connected to external terminal 330 by, for example, welding. To the other one of positive electrode 201 and negative electrode 202 (in the example of the drawing, positive electrode 201), the other internal lead wire 220 is connected. Internal lead wire 220 is connected to the inner surface of battery can 100 by, for example, welding.

In wound electrode body 200, an entire surface of each of the first principal surface and the second principal surface of negative electrode 202 faces positive electrode 201. A total area of the first principal surface and the second principal surface is 100 cm$^2$ or more and 180 cm$^2$ or less as described above. Wound electrode body 200, together with a nonaqueous electrolyte solution (not shown), is housed in battery can 100. Upper insulating plate 230A and lower insulating plate 230B are disposed to the upper portion and the lower portion of electrode body 200, respectively, for prevention of internal short circuit.

In the example shown in the drawing, a cylindrical lithium primary battery is described, but the example is not limited to this case alone, this exemplary embodiment can be applied to lithium primary batteries provided with a wound electrode body in which a shape of the end face in the winding axis direction of the wound electrode body is elliptic or rectangular. Furthermore, as to the configurations other than the electrode body of the lithium primary battery, well-known configurations can be used without limitation.

The lithium primary battery according to the above aspect has excellent discharge performance of a pulse current and life performance. Therefore, the lithium primary battery is suitable to be installed on a device controlled so that a pulse current is discharged over a long period of time. Such a device may be controlled so that a pulse current and a base current smaller than the pulse current are discharged. Discharge of a lithium primary battery is usually controlled by a discharge control unit. Such a device is not particularly limited, and examples of the device include a device having a communication function (for example, a meter having a communication function), and the like.

Furthermore, the present invention includes a device having a communication function in which the above-mentioned lithium primary battery is installed. Such a device is supplied with electric power from the lithium primary battery. Examples of such a device include electronic devices or electrical devices such as a meter. Examples of the meter include various meters such as an electricity meter, a gas meter, and a water meter. Such a device may incorporate a communication unit, or may be externally provided with a communication device. The lithium primary battery may supply a device itself such as a meter with electric power, or may supply a communication device with electric power. Since the lithium primary battery has excellent discharge property of a pulse current, the lithium primary battery is preferably installed so as to supply at least a cored unit or a communication device with electric power.

The present invention includes a discharge system including the above-mentioned lithium primary battery, and the above-mentioned discharge control unit for controlling discharge of the lithium primary battery. The discharge control unit may be incorporated into a device such as a meter (electronic device, electrical device, and the like). The discharge system can include a well-known unit included in a discharge system of the lithium primary battery as necessary.

This exemplary embodiment includes a use method of a lithium primary battery. The method include a step of discharging at least a pulse current from the above-mentioned lithium primary battery. The use method of a lithium primary battery may include a step of discharging a pulse current and a step of discharging a base current.

The pulse current is, for example, 200 mA or more, preferably more than 200 mA, and further preferably 300 mA or more. The pulse current is, for example, 700 mA or less, preferably less than 700 mA, and more preferably 600 mA or less. These lower limit values and upper limit values can be arbitrarily combined. Even when such a large pulse current is discharged, when the above-mentioned lithium primary battery is used, stable discharge can be performed and a long life can be secured. From the viewpoint that high current density is easily secured with appropriate load, and metal manganese that accumulated on the negative electrode during pulse discharge can be removed efficiently, the pulse current is preferably more than 200 mA and less than 700 mA, and further preferably 300 mA or more and 600 mA or less.

A discharge schedule of a pulse current from the lithium primary battery can be set depending on applications. For example, a lithium primary battery may be controlled so that a pulse current is discharged at least once (preferably twice or more) per day. The upper limit of the number of times of discharging of pulse current per day is not particularly limited, and may be determined depending on applications and/or desired information, but, for example, the time is ten times or less and may be five times or less. These lower limit values and upper limit values can be arbitrarily combined. The period of time of discharging a pulse current for one time is, for example, 5 seconds or less, and may be 0.1 seconds or more and 1.5 seconds or less.

The base current is only required to be smaller than the pulse current, and may be determined depending on application. The base current is preferably a fine current, and, for example, 50 µA or less, may be 10 µA or less or 6 µA or less. The base current is preferably 1 µA or more, and more preferably 2 µA or more. These lower limit values and upper limit values can be arbitrarily combined. When the base current is in such a range, for example, electric power enough to collect data in a steady manner can be supplied. Necessary battery capacity is determined depending on the life required for a device on which a battery is installed, and the size of the pulse current and the size of the base current. Therefore, the size of lithium primary battery in accordance with the above aspect of the present invention may be determined depending on the required battery capacity. For example, the size of the battery may be increased by increasing the thickness of the electrode. The size of the battery is not particularly limited, and, for example, may be any one of A-size, C-size, and D-size.

EXAMPLE

Hereinafter, the present invention is specifically described based on Examples and Comparative Examples, but the present invention is not intended to be limited to the following Examples.

Examples 1 to 3 and Comparative Examples 1 to 6

(1) Production of Positive Electrode

A positive electrode was produced as follows, 3 parts by mass of Ketjen black as a conductive agent, 5 parts by mass of polytetrafluoroethylene as a binding agent, and an appropriate amount of pure water were added to 92 parts by mass of electrolyzed manganese dioxide which had been baked at 400° C. for 7 hours, and the resultant product was kneaded to prepare a wet positive electrode mixture.

Next, the wet positive electrode mixture was filled in a positive electrode current collector including expanded metal made of stainless steel (SUS316) to produce an electrode plate precursor. Then, the electrode plate precursor was dried, rolled by a roll press, and cut into a predetermined dimension to obtain a sheet-like positive electrode. An application amount of the positive electrode mixture was adjusted so that the design capacity became values shown in Table 1. A dimension of the positive electrode was adjusted so that an area of a portion of a principal surface of the negative electrode, not facing the positive electrode, became values shown in Table 1, in a case where the negative electrode whose total area of the first principal surface and the second principal surface became values shown in Table 1 was used.

(2) Production of Negative Electrode

A sheet-like Li and a Li—Al alloy (Al content with respect to lithium included in the negative electrode: 0.3% by mass) was cut into a predetermined dimension such that the total area of the first principal surface and the second principal surface of the negative electrode was values shown in Table 1 to obtain a sheet-like negative electrode. The dimensions (width, height, and/or thickness) of the sheet were adjusted so that the amount of Li included in the negative electrode was the same in Examples and Comparative Examples.

The ratio Cn/Cp of the capacity Cn of the negative electrode to the capacity Cp of the positive electrode was 1.1 in Examples 1 to 3 and Comparative Examples 1 to 4, and was 1.15 in Comparative Examples 5 to 6.

(3) Production of Electrode Group

A positive electrode mixture was peeled from a portion of the positive electrode to expose a positive electrode current collector, and a positive electrode tab lead made of stainless steel was resistance-welded to the exposed part. A negative electrode tab lead made of nickel was connected by pressure welding to a predetermined section of the negative electrode. The positive electrode and the negative electrode were spirally wound with the separator interposed therebetween to constitute a columnar wound electrode body. At this time, the positive electrode and the negative electrode were laminated to each other via the separator so that an area in which the principal surface of the negative electrode does not face the positive electrode became the values shown in Table 1.

As the separator, a three-layered microporous film (thickness: 40 μm) composed of a microporous layer made of polyethylene (intermediate layer having a thickness of 20 μm) and two microporous layers made of polypropylene (outer layer having a thickness of 10 μm) sandwiching the intermediate layer was used.

(4) Preparation of Nonaqueous Electrolyte Solution

Lithium trifluoromethanesulfonate as a lithium salt was dissolved at a concentration of 0.75 mol/L in a nonaqueous solvent obtained by mixing propylene carbonate (PC), ethylene carbonate (EC), and 1,2-dimethoxyethane (DME) in a volume ratio of 1:1:2 to prepare a nonaqueous electrolyte solution.

(5) Assembly of Lithium Primary Battery

An electrode body, with a ring-shaped lower insulating plate disposed at its bottom, was inserted into the inside of a battery can having a bottomed cylindrical shape and being made of stainless steel (SUS316). A positive electrode tab lead was resistance-welded to the inner bottom surface of the battery can, the upper insulating plate was disposed to the upper part of the electrode body, and then the negative electrode tab lead was resistance-welded to an external terminal fixed to a sealing plate. Next, a nonaqueous electrolyte solution was injected into the battery can and allowed to infiltrate into the electrode group. Thereafter, the sealing plate was inserted into the vicinity of the opening of the battery can, and a part in which an opening portion of the can and the sealing plate are fitted into each other was laser welded. In this way, sealed cylindrical lithium primary batteries (diameter: 17.4 mm, height: 50 mm) each having a structure shown in FIG. 1 were produced. Forty batteries for each example were produced. Thereafter, each battery was pre-discharged so that each battery voltage became 3.2 V.

(6) Evaluation

The produced lithium primary batteries were subjected to the following evaluations.

(a) Initial Maintenance Voltage

Pulse discharge at a current of 500 mA was performed for one second while a base current of 5 μA was discharged. The pulse discharge was performed twice in 24 hours, then a closed circuit voltage (CCV) was measured, and this voltage was defined as an initial sustaining voltage (V).

(b) Maintenance Voltage Assuming Use for 10 Years (Assuming Use for 9 to 10 Years)

Ten lithium primary batteries after measuring the initial maintenance voltage were discharged at 1300 mAh, and stored at 70° C. at 90% RH for 103 days. The batteries after storage were subjected to a pulse discharge at a current of 500 mA for one second while a base current of 5 μA was discharged. The pulse discharge was performed twice in 24 hours. The discharge per day was repeated for 360 days, and CCV was measured.

The discharge at 1300 mAh is a discharge corresponding to the case where the lithium primary battery is used for 9 years under the above-mentioned conditions of the base current and the pulse discharge. The storage at 70° C. at 90% RH for 103 days is humidity and heat stress conditions corresponding to the use of for 9 years. The discharge corresponding to 9 years was performed with a constant resistance of 2 kΩ installed.

(c) Maintenance Voltage Assuming Use for 15 Years (Assuming Use for 14 to 15 Years)

Ten lithium primary batteries after measuring the initial maintenance voltage were discharged at 2030 mAh, and stored at 70° C. at 90% RH for 160 days. The batteries after storage were subjected to a pulse discharge at a current of 500 mA for one second while a base current of 5 μA was discharged. The pulse discharge was performed twice in 24 hours. The discharge per day was repeated for 360 days, and CCV was measured, and the measured values of CCV are shown in Table 1.

The discharge at 2030 mAh is a discharge corresponding to the case where the lithium primary battery is used for 14 years under the above-mentioned conditions of the base current and the pulse discharge. The storage at 70° C. at 90% RH for 160 days is humidity and heat stress conditions corresponding to the use of for 14 years. The discharge corresponding to 14 years was performed with a constant resistance of 2 kΩ installed.

(d) Maintenance Voltage Assuming Use for 18 Years (Assuming Use for 17 to 18 Years)

Ten lithium primary batteries after measuring the initial maintenance voltage were discharged at 2470 mAh, and stored at 70° C. at 90% RH for 193 days. The batteries after storage were subjected to a pulse discharge at a current of 500 mA for one second while a base current of 5 μA was discharged. The pulse discharge was performed twice in 24 hours. The discharge per day was repeated for 360 days, and CCV was measured, and the measured values of CCV are shown in Table 1.

The discharge at 2470 mAh is a discharge corresponding to the case where the lithium primary battery is used for 17 years under the above-mentioned conditions of the base current and the pulse discharge. The storage at 70° C. at 90% RH for 193 days is humidity and heat stress conditions corresponding to the use of for 17 years. The discharge was performed with a constant resistance of 2 kΩ installed until discharge corresponding to 17 years.

(e) Maintenance Voltage Assuming Use for 20 Years (Assuming Use for 19 to 20 Years)

Remaining ten lithium primary batteries after measuring the initial maintenance voltage were discharged at 2750 mAh, and stored at 70° C. at 90% RH for 216 days. The batteries after storage were subjected to a pulse discharge at a current of 500 mA for one second while a base current of 5 μA was discharged. The pulse discharge was performed twice in 24 hours. The discharge per day was repeated for 360 days, and CCV was measured, and the measured values of CCV are shown in Table 1.

The discharge at 2750 mAh is a discharge corresponding to the case where the lithium primary battery is used for about 19.0 years. The discharge capacity after use for 20 years is 2900 mAh. The storage at 70° C. at 90% RH for 217 days is humidity and heat stress conditions corresponding to the use of for 19 years. The discharge was performed with a constant resistance of 2 kΩ installed until discharge corresponding to 19 years.

(f) Discharge Capacity and Utilization Rate of Battery Capacity

In the evaluations of the (c) to (e) above, a value of CCV of 2.0 V or more was defined as a threshold value, and a discharge capacity up to a time point when the value became less than that was determined as a battery capacity. In the case of (e), after discharge at 2750 mAh, also after a pulse discharge test was repeated for 360 days, this evaluation was continued, and the discharge capacity until the value of CCV was less than 2.0 V. However, the value of CCV became less than 2.0 V before 360 days have passed, the discharge capacity at that time point was defined as a discharge capacity at the completion of the test. Furthermore, the percentage (%) of the discharge capacity with respect to the design capacity was calculated, and the calculated rate was defined as the utilization rate of the battery capacity.

Results of Examples 1 to 3 and Comparative Examples 1 to 6 are shown in Table 1. Examples 1 to 3 are A1 to A3, and Comparative Examples 1 to 6 are B1 to B6. Table 1 also shows design capacity of each battery, a total area of principal surfaces of the positive electrode not facing the negative electrode (that is, a total area of portion that does not face the negative electrode in the third principal surface and the fourth principal surface of the positive electrode), and the total area of the principal surfaces (first principal surface and second principal surface) of the negative electrode.

TABLE 1

|  | Design capacity mAh | Total area of principal surface of positive electrode not facing negative electrode cm² | Total area of principal surfaces of negative electrode cm² | Initial maintenance voltage V | Maintenance voltage assuming use for 10 years (9-10 years) V | Maintenance voltage assuming use for 15 years (14-15 years) V | Maintenance voltage assuming use for 18 years (17-18 years) V | Maintenance voltage assuming use for 20 years (19-20 years) V | Discharge capacity (2 V cut) mAh | Utilization rate of battery capacity % |
|---|---|---|---|---|---|---|---|---|---|---|
| A1 | 3000 | 0 | 140 | 2.93 | 2.75 | 2.53 | 2.40 | 2.28 | 3013 | 100 |
| A2 | 3000 | 0 | 180 | 2.94 | 2.74 | 2.52 | 2.39 | 2.22 | 2966 | 99 |
| A3 | 3000 | 0 | 100 | 2.92 | 2.7 | 2.55 | 2.35 | 2.13 | 2952 | 98 |
| B1 | 3000 | 0 | 190 | 2.94 | 2.73 | 2.49 | 2.26 | x | 2770 | 92 |
| B2 | 3000 | 0 | 90 | 2.84 | 2.66 | 2.4 | 2.29 | x | 2760 | 92 |
| B3 | 3000 | 5 | 140 | 2.92 | 2.71 | 2.41 | x | x | 2590 | 86 |
| B4 | 3000 | 10 | 140 | 2.92 | 2.67 | 2.38 | x | x | 2496 | 83 |
| B5 | 3000 | 22 | 140 | 2.91 | 2.59 | 2.29 | x | x | 2480 | 83 |
| B6 | 3000 | 22 | 250 | 2.93 | 2.75 | 2.35 | x | x | 2602 | 87 |

As shown in Table 1, assumption of use for 10 years, all batteries of Examples and Comparative Examples have high CCV value of 2.0 V or more. However, under condition of assumption of use for 20 years, in Comparative Example, no battery maintain 2.0 V, for between 15 years and 20 years, the maintain voltage was 2.0 V or less, the battery capacity is considerably smaller than the designed capacity. On the contrary, in Examples, also under the condition of assumption of use for 20 years, a high battery voltage can be secured. Furthermore, in Examples, also under the condition of assumption of use of more than 20 years, the utilization rate of the battery capacity with respect to the design capacity was 98% or more, showing that the utilization rate that is extremely higher than that of Comparative Examples is obtained. This is thought to be because as compared with Comparative Examples, in Examples, increase in the internal resistance due to accumulation of metal manganese is suppressed. Furthermore, Example 1 shows discharge capacity that is not less than the design capacity, but this is thought to be because the ratio of the raw material manganese dioxide was more than 0.93.

Example 4

A cylindrical lithium primary battery was produced and evaluated in the same manner as in Example 1 except that a microporous film (thickness: 40 μm) made of polyethylene was used as a separator.

Initial maintenance voltage and a maintenance voltage at assumption of use for 20 years of Example 4 are shown in Table 2. Table 2 also shows results of Example 1. Example 4 is A4.

TABLE 2

| | Layer structure of separator | Initial maintenance voltage V | Maintenance voltage assuming use for 20 years V |
|---|---|---|---|
| A1 | Multilayer | 2.93 | 2.41 |
| A4 | Single layer | 2.94 | 2.20 |

As shown in Table 2, also in Example 4 using a single-layered separator, a high maintenance voltage is obtained under conditions of assumption of use for 20 years, showing that discharge property of a pulse current is excellent, and a long life can be secured. However, Example 1 can secure a higher maintenance voltage under conditions of assumption of use for 20 years as compared with Example 4. This is thought to be because in Example 1, use of the separator having a three-layered structure increases a length of a path through which ion penetrates in the pore inside the separator, and accumulation of metal manganese is suppressed as compared with Example 4. In this way, from the viewpoint that the effect of suppressing the increase of the internal resistance is enhanced, it is preferable to use a separator having a multilayer structure.

Examples 5 to 8

A cylindrical lithium primary battery was produced and evaluated in the same manner as in Example 1 except that a separator having a thickness shown in Table 3 was used. The thickness of the separator was adjusted by adjusting a thickness of an outer layer. However, only in Example 5, a separator having an intermediate layer having a thickness of 10 μm and an outer layer having a thickness of 5 μm was used.

Initial maintenance voltages of Examples 5 to 8 and the maintenance voltage of assumption of use for 20 years are shown in Table 3. Table 3 also shows results of Example 1. Examples 5 to 8 are A5 to A8.

TABLE 3

| | Thickness of separator μm | Initial maintenance voltage V | Maintenance voltage assuming use for 20 years V |
|---|---|---|---|
| A5 | 20 | 2.94 | 2.19 |
| A6 | 30 | 2.95 | 2.36 |

TABLE 3-continued

| | Thickness of separator μm | Initial maintenance voltage V | Maintenance voltage assuming use for 20 years V |
|---|---|---|---|
| A1 | 40 | 2.93 | 2.41 |
| A7 | 50 | 2.83 | 2.30 |
| A8 | 60 | 2.72 | 2.19 |

Also Examples 5 to 8, high maintenance voltage under conditions of assumption of use for 20 years is obtained, discharge property of the pulse current is excellent, and a long life can be secured. From the viewpoint that the maintenance voltage is secured also under conditions of assumption of use for 20 years, the thickness of the separator is preferably more than 20 μm, and further preferably 30 μm or more. Furthermore, the thickness of the separator is preferably less than 60 μm, and further preferably 50 μm or less. It is considered that in a case where the thickness of the separator is in such a range, the initial maintenance voltage is also high, and the movement of metallic manganese dissolved from the positive electrode in the separator is limited and the accumulation of metallic manganese is suppressed even under conditions of assumption of use for 20 years.

Examples 9 to 12

Using the lithium primary battery produced in the same manner as in Example 1, an electric current of a pulse discharge was evaluated as a maintenance voltage of assumption of use for 20 years. However, an electric current of a pulse discharge was made to be a value shown in Table 4. Furthermore, time per pulse was adjusted so that the total electric capacity was the same.

The discharge capacity of assumption of use for 20 years and the utilization rate of the battery capacity of Examples 9 to 12 are shown in Table 4. Table 4 also shows the results of Example 1. Examples 9 to 12 are A9 to A12.

TABLE 4

| | Pulse current mA | Maintenance voltage assuming use for 20 years V |
|---|---|---|
| A9 | 200 | 2.18 |
| A10 | 300 | 2.32 |
| A1 | 500 | 2.41 |
| A11 | 600 | 2.35 |
| A12 | 700 | 2.06 |

Under conditions of assumption of use for 20 years, even in a case where an electric current of a pulse discharge is 200 mA to 700 mA, a high maintenance voltage was obtained. From the viewpoint of securing a higher maintenance voltage, an electric current of a pulse discharge is preferably more than 200 mA and less than 700 mA, and more preferably 300 mA or more and 600 mA or less. In a case where the electric current of a pulse discharge is in such a range, a higher current density is easily secured with an appropriate load, and metal manganese that precipitated on a coating film of the negative electrode during pulse discharge can be efficiently removed.

INDUSTRIAL APPLICABILITY

A lithium primary battery in accordance with the above aspect of the present invention has excellent discharge performance of a pulse current and a long life. Therefore, the lithium primary battery is suitable to be installed on a device that has been controlled so that a pulse current is discharged. Examples of such devices include various types of devices having a communication function (electronic device, electrical device, and the like), such as a meter (a smart meter, etc.), having a communication function.

REFERENCE MARKS IN THE DRAWINGS 10 lithium primary battery
100 battery can
200 wound electrode body
201 positive electrode
202 negative electrode
203 separator
210 internal lead wire
230A upper insulating plate
230B lower insulating plate
300 sealing plate
310 insulating gasket
330 external terminal

The invention claimed is:

1. A lithium primary battery comprising:
   a wound electrode body obtained by winding a sheet-like positive electrode, a sheet-like negative electrode, and a separator interposed between the positive electrode and the negative electrode; and
   a nonaqueous electrolyte solution,
   wherein the positive electrode includes manganese dioxide as a positive electrode active material,
   the negative electrode includes at least one selected from the group consisting of metallic lithium and lithium alloys, and has a first principal surface and a second principal surface opposite to the first principal surface,
   an entire surface of each of the first principal surface and the second principal surface faces the positive electrode, and
   a total area of the first principal surface and the second principal surface is 100 $cm^2$ or more and 180 $cm^2$ or less.

2. The lithium primary battery according to claim 1, wherein capacity Cn of the negative electrode is larger than capacity Cp of the positive electrode.

3. The lithium primary battery according to claim 1, wherein the lithium primary battery has design capacity of 2.9 Ah or more.

4. The lithium primary battery according to claim 1, comprising a battery can housing the wound electrode body and the nonaqueous electrolyte solution, and a sealing body for sealing an opening of the battery can by laser welding.

5. The lithium primary battery according to claim 1, wherein the separator has a multilayer structure of at least three layers.

6. The lithium primary battery according to claim 1, wherein the separator is a microporous film having a thickness of 30 μm or more and 50 μm or less.

7. The lithium primary battery according to claim 1, wherein the lithium primary battery is installed on a device controlled so that a pulse current and a base current that is smaller than the pulse current are discharged.

8. The lithium primary battery according to claim 7, wherein the pulse current is 200 mA or more.

9. The lithium primary battery according to claim 7, wherein the pulse current is 300 mA or more and 600 mA or less.

10. The lithium primary battery according to claim 7, wherein the pulse current is discharged at least once a day.

11. The lithium primary battery according to claim 7, wherein the pulse current is discharged two or more times a day.

12. The lithium primary battery according to claim 7, wherein the base current is 0.1 μA or more.

13. A meter device, comprising:
    the lithium primary battery according to claim 1; and
    a control unit for controlling the lithium primary battery, wherein the control unit controls the lithium primary battery to discharge a pulse current and a base current that is smaller than the pulse current.

14. The meter device according to claim 13, wherein the pulse current is 200 mA or more.

15. The meter device according to claim 13, wherein the pulse current is 300 mA or more and 600 mA or less.

16. The meter device according to claim 13, wherein the pulse current is discharged at least once a day.

17. The meter device according to claim 13, wherein the pulse current is discharged two or more times a day.

18. The meter device according to claim 13, wherein the base current is 0.1 μA or more.

* * * * *